United States Patent
Chopra et al.

(10) Patent No.: US 11,997,209 B1
(45) Date of Patent: May 28, 2024

(54) ENHANCED SECRET ROTATION IN DATA HASHING

(71) Applicant: Amazon Technologies, Inc., Seattle, WA (US)

(72) Inventors: Rahul Chopra, Bellevue, WA (US); Maurice Lin, Bothell, WA (US); Pramod Raghavendran, Redmond, WA (US); Keerat Singh Sharma, Longmont, CO (US)

(73) Assignee: Amazon Technologies, Inc., Seattle, WA (US)

( * ) Notice: Subject to any disclaimer, the term of this patent is extended or adjusted under 35 U.S.C. 154(b) by 432 days.

(21) Appl. No.: 17/208,881

(22) Filed: Mar. 22, 2021

(51) Int. Cl.
  *H04L 9/32* (2006.01)
  *H04L 9/00* (2022.01)

(52) U.S. Cl.
  CPC ............ *H04L 9/3236* (2013.01); *H04L 9/50* (2022.05)

(58) Field of Classification Search
  None
  See application file for complete search history.

(56) References Cited

U.S. PATENT DOCUMENTS

| | | | |
|---|---|---|---|
| 9,246,686 B1* | 1/2016 | Holland | H04L 63/12 |
| 2018/0082082 A1* | 3/2018 | Lowenberg | G06F 21/602 |
| 2020/0311297 A1* | 10/2020 | Langseth | H04L 9/0643 |
| 2021/0344497 A1* | 11/2021 | Wright | H04L 9/0643 |
| 2022/0174061 A1* | 6/2022 | Chitkara | H04L 63/108 |

* cited by examiner

*Primary Examiner* — Syed A Roni
(74) *Attorney, Agent, or Firm* — Eversheds Sutherland (US) LLP

(57) ABSTRACT

Devices, systems, and methods are provided for rotating cryptography secrets in data hashing. A method may include generating, based on a hashing technique, first obfuscated data using first data and a first version of a secret, and generating first metadata associated with the first obfuscated data, the first metadata indicative of the first version of the secret. The method may include determining a second version of the secret based on the first metadata. The method may include generating, based on the hashing technique, second obfuscated data using the first obfuscated data and the second version of the secret, and generating second metadata associated with the second obfuscated data, the second metadata indicative of the second version of the secret.

20 Claims, 8 Drawing Sheets

ENHANCED SECRET ROTATION IN DATA HASHING

BACKGROUND

Computer systems may use processes to replace information, such as personal information, with artificial identifiers for data protection. To protect against attackers who may attempt to map data to a hashed version of the data, an additional input may be added to data prior to hashing. The additional input may be private so that without it, an attacker may not determine the mapping between the data and the hashed data. Rotating the additional input may provide additional protection against potential attacks. However, rotating the additional input may result in prior data using a previous additional input not being joined with existing or new data using a newer additional input.

Figure 1:
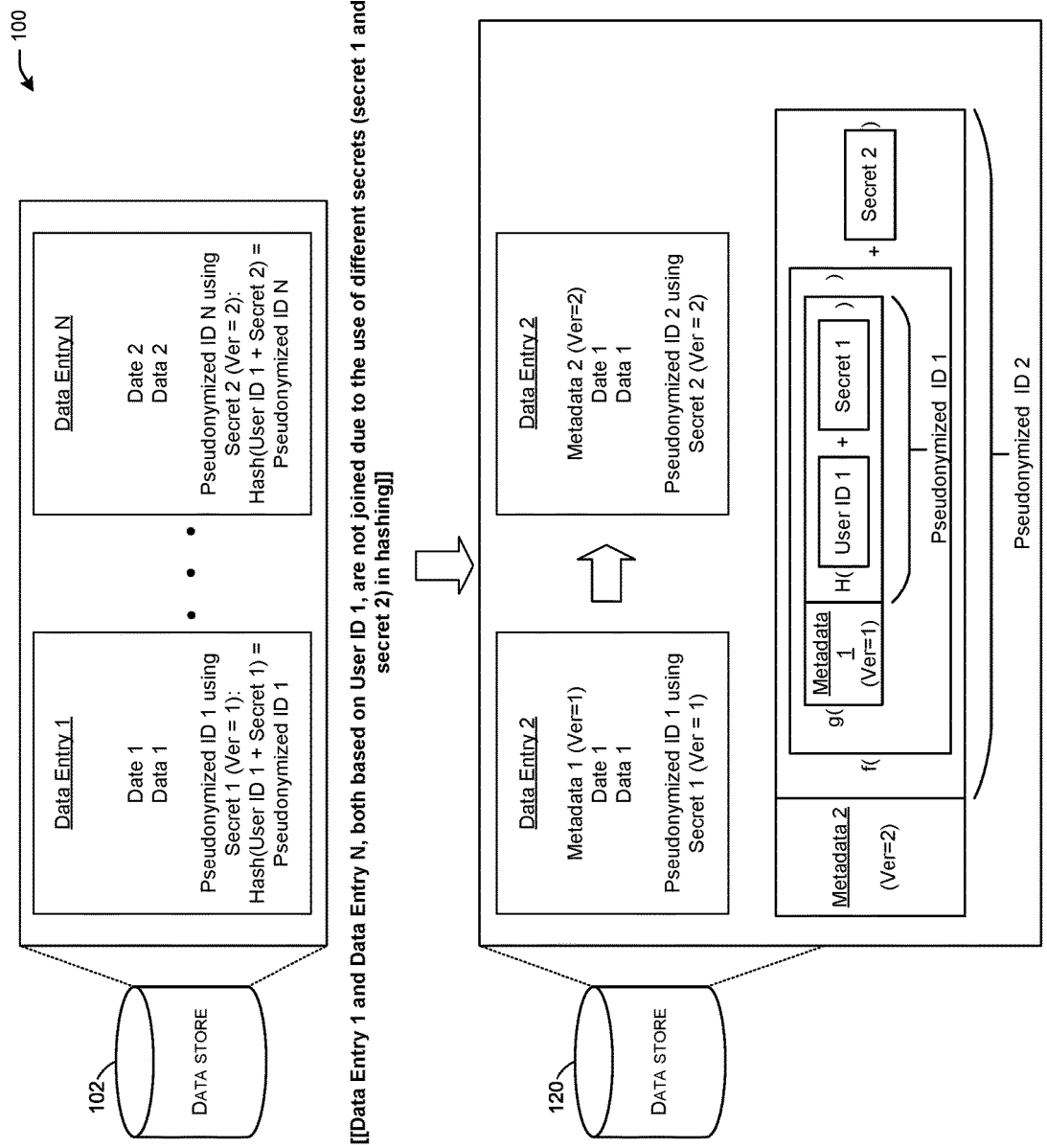
FIG. 1 illustrates an example system for enhanced secret rotation in data hashing, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced secret rotation in data hashing.

Computers increasingly are being used for data storage. In a digital world, data privacy may be important, and pseudonymization is a solution to handle data in a private, secure manner. Pseudonymization is a data management and de-identification procedure by which personally identifiable or other sensitive information fields within a data record are replaced by one or more artificial identifiers, or pseudonyms. A single pseudonym for a replaced field or collection of replaced fields renders a data record less identifiable while remaining suitable for data analysis and data processing.

Hashing allows for pseudonymizing the data. One-way hashing makes it difficult for attackers to derive an actual identity from the hashed version of data. One way to break data pseudonymity is by creating a mapping between data and a hashed version of the data, and to perform a reverse lookup. To eliminate the possibility of such mapping table, often a secret (e.g., a salt, pepper, etc. referred to as an additional input) is added to the data before hashing. For example, a salt may be added to a password (e.g., password123+[salt value]=password123 [salt value]), so the string to be hashed may be the password plus the salt value, resulting in a corresponding hash value.

The salt may remain private to a data owner and kept confidential. Without a salt, an attacker cannot construct a mapping table between data and hashed data, thereby strengthening the pseudonymity of the data. The longer the time period that the salt remains unaltered, the higher the risk of the salt being compromised.

One practice in information security is to rotate (e.g., change) the salt before a substantial security risk occurs. However, one concern regarding rotating the salt for pseudonymized data is a loss of capability to join the new data (e.g., data hashed with the newest salt) with existing data (e.g., data hashed with a prior version of the salt). For example, when a first data entry for a user is pseudonymized using a first salt, and a second data entry for the same user is pseudonymized using a second salt, the pseudonymized data entries may not be recognized as entries for the same user because of the different salts that were used. Once the salt is rotated, for example, data may start producing a new version of hashed data, because of which old data and new data may not be related. For example, data that was hashed using a previous version of a salt (e.g., hashing a string of data+salt version 1 produces a first hashed value) may be "lost" when a salt is rotated (e.g., salt version 1 is updated to salt version 2) because the mapping between the un-hashed and hashed data depends on the salt version, and the data hashed using a previous version of the salt may not map to the un-hashed data when the mapping relies on the newest version of the salt.

There is therefore a need for enhanced secret rotation in data hashing.

In one or more embodiments, enhanced secret rotation in data hashing may have backward capability so that new data entries using a newer secret for pseudonymization or other data obfuscation may be joined with older data entries using an older secret for pseudonymization. The enhanced secret rotation in data hashing may use forward hashing, referring to a pure pseudonymized technique, which may allow users to rotate a salt and/or hashing algorithm, and may enable user to migrate data (e.g., batch mode or at the runtime) to a latest version of data, preventing any kind of data loss.

In one or more embodiments, enhanced secret rotation in data hashing may, when the secret is rotated, generate a new version of hashed identity. In a forward hashing technique, pseudonymized or other obfuscated data may be prefixed with metadata indicating the identity version (e.g., of the secret). Pseudonymized other obfuscated data in this technique may be generated based on an immediately preceding version of the data (e.g., a version of the data using the immediately previous secret). For any base data I, the nth version of pseudonymized other obfuscated data I'n after the secret rotation may be derived with I'n−1 using following hashing technique:

$$I'n = \text{metadata} + f(g(I'n-1) + \text{secret}(n)) \quad (1);$$

Where I'n is the $n^{th}$ version of pseudonymized other obfuscated data generated with nth version of the secret; I'n−1 is the $(n-1)^{th}$ version of pseudonymized other obfuscated data generated with $(n-1)^{th}$ version of the secret; metadata refers to reserved bytes indicating the version of the data (e.g., version of the secret used and/or the encryption method used); f(x) is a hashing algorithm (e.g., Secure Hash Algorithm-2 (SHA2), Secure Hash Algorithm-512 (SHA512), Hash-Based Message Authentication Code (HMAC), etc.); g(x) is a stripping function on pseudonymized other obfuscated data that returns the pseudonymized other obfuscated data after stripping the metadata; and secret(n) is the $n^{th}$ version of secret after $(n-1)^{th}$ rotation. In this manner, Equation (1) above joins a current version of pseudonymized other obfuscated data with a previous version of the pseudonymized other obfuscated data.

For example, using Equation (1) above, when a first data entry includes a first name, a first action, a first user identifier, and a first date, and is pseudonymized or otherwise obfuscated using a first secret, then the first secret is later changed to a second secret used to pseudonymize or otherwise obfuscate a second data entry including the first name, a second action, a second user identifier, and a second date, the first and second data entries may be joined. f(g(I'n−1)+secret(n)) of Equation (1) may strip the metadata of the first data entry (e.g., the $(n-1)^{th}$ version), add the nth version of the secret, and add new metadata to the first data entry to indicate that the $n^{th}$ version of the secret is used for the second data entry. In this manner, when hashing the second data entry with the $n^{th}$ version of the secret, the first data entry generated with the $(n-1)^{th}$ version of the secret may be used, thereby joining the second data entry with the first data entry even though the hashing may be one-way and backward compatible.

Pseudonymized or otherwise obfuscated data derived using Equation (1) has following features: 1) It provides pure pseudonymized or otherwise obfuscated data generated using a practically pure one-way hashing function; 2) The metadata may be used to identify the version of data, and may be compared with the latest version of a secret to identify whether the data are the most recent version or not. If data are not the latest version, Equation (1) may be used to update the data version; 3) The data derived with Equation (1) may be used to compare data entries and determine whether they are logically the same. These features may prevent any kind of data loss by either performing a one-time operation of bulk updating the pseudonymized or otherwise obfuscated data or by refreshing the pseudonymized or otherwise obfuscated data to latest version on demand.

In one or more embodiments, enhanced secret rotation in data hashing may be used by one or multiple devices and computer services. For example, cloud-based computing environments may execute serverless computing instances to implement Equation (1) for any data records, such as sales data, advertising data, user login credentials, personal information, and the like. For example, a computing instance may analyze pseudonymized or otherwise obfuscated data to identify user preferences or sales data (e.g., users who purchased or viewed certain products, products purchased or viewed by a user, etc.), to determine whether advertisements have been presented to or viewed by a user, or the like. The enhanced secret rotation in data hashing may be used to control access to computer-based (e.g., web services) resources (e.g., databases, computer code, applications, etc.). Because data may be pseudonymized or otherwise obfuscated, Equation (1) for enhanced secret rotation in data hashing may be used to prevent data loss by joining older and newer data entries (e.g., orphan data sets) that may use different versions of an encryption secret.

Pre-image resistant functions may include one-way functions (i.e., functions that may not be computationally difficult to compute for a current value, but may not be computationally trivial to determine a previous value from the current value), having a recurrence relationship to a previous value of the function. A one-way membership function may not be mathematically proven/provable as one-way, but may have computational complexity properties that render the function pre-image resistant. One-way functions (also referred to as "effectively one-way functions") may include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that f(x)=y is below a specified threshold), second pre-image resistance (given an input x1, the probability of randomly generating another input x2, different from x1, such that f(x1)=f(x2) is below a specified threshold) and/or collision resistance (the probability of two different inputs resulting in the same output is less than a specified threshold). One-way functions suitable for use in generating an identifier for data may include functions that satisfy properties of collision resistance (i.e., the probability of f(x1)=f(x2) for different x1 and x2 is below a threshold). Other hash functions usable in accordance with the techniques of the present disclosure may include, but are not limited to, functions described in the National Institute of Standards and Technology (NIST) Special Publication 800-107, Revision 1 "Recommendation for Applications Using Approved Hash Algorithms," which is incorporated herein by reference.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for enhanced secret rotation in data hashing, in accordance with one or more example embodiments of the present disclosure.

Referring to FIG. 1, the system 100 may include a data store 102 or other data storage having access to data entries (e.g., data records), such as data entry 1, data entry N, etc. The data entries may indicate a user (e.g., user identifier), a date, and data (e.g., purchase data, resource view data, access data, advertisement view data, subscriber data, user request data, and the like). As shown, data entry 1 includes first pseudonymized data (pseudonymized ID 1) based on a hashing of a first user identifier (user ID 1) and a first version of a cryptography secret (secret 1), and may include other information such as a first date (date 1), and first data (data 1), and data entry N includes second pseudonymized data (pseudonymized ID N) based on a hashing of the first user identifier (user ID 2) and a second version of the cryptography secret (secret 2), and may include other information such as a second date (date 2), and second data (data 2). For example, when the data entries represent purchase data, the first and second data may indicate which product(s) are purchased on the respective dates, and by which customers (e.g., users). However, to protect customer/user identification information, the user ID 1 may be hashed with a secret (e.g., a cryptography salt, pepper, etc.).

Any of the information in the data entries may be pseudonymized or otherwise obfuscated by using a secret. In this manner, the first and second pseudonymized data may refer to a same user, but because the data in the different data entries may be pseudonymized using different secrets (e.g., rotated versions of the secret), the data store 102 or any system accessing the data store 102 may be unable to determine that the first pseudonymized data and the second pseudonymized belong to a same user (e.g., are joined). In this manner, any analysis of the data entries to identify commonality among users, purchases, views, etc. may not be able to link data using one version of a secret with data using another version of the secret.

For example, when a cryptography salt (e.g., secret 1) is rotated (e.g., to generate secret 2), the data pseudonymized using the different cryptography salts may not be joined because the user ID 1 may be hashed with the first version of the cryptography salt (e.g., secret 1), and the user ID 1 may be hashed with the second version of the cryptography salt (e.g., secret 2), and any data hashed with an older version of the cryptography salt may not map to the unhashed data once a salt is rotated. In this manner, the data entry 1 and the data entry 2 may be based on the same user ID (user ID 1), but a system may not be able to make such a determination once the first version of the secret (secret 1) is rotated to generate the second version of the secret (secret 2). In particular, because the hashing function may be a one-way hashing function, the pseudonymized ID may be what is retrieved from the data store 102 (e.g., the inputs such as the user ID and secret may not be provided). Because the pseudonymized ID 1 was generated using the secret 1 and the pseudonymized ID 2 was generated using the secret 2, there may be no way to identify that the pseudonymized ID 1 and the pseudonymized ID 2 are based on the same data (e.g., the user ID 1).

Still referring to FIG. 1, the joining problem of the data entries may be solved by using an enhanced secret rotation process that links the first pseudonymized data to the second pseudonymized data by generating the second pseudonymized data based on the first pseudonymized data. For example, a data store 120 that stores a data entry 2, and the enhanced secret rotation process may generate the second pseudonymized data (pseudonymized ID 2) based on the first pseudonymized data (pseudonymized ID 1). In particular, Equation (1) above may join the pseudonymized ID 1 with the pseudonymized ID 2 because the pseudonymized ID 2 may refer to the $n^{th}$ version of the information (e.g., user ID 1) and the secret 2, and the pseudonymized ID 1 may refer to $n-1^{th}$ version of the information hashed with (e.g., the function H( ) as shown) the secret 1 (e.g., the secret 1 may be a first version of the cryptography secret, and the secret 2 may be a rotated, second version of the cryptography secret) and prefixed with first metadata (e.g., metadata indicative of use of the first version of the secret, ver=1 for secret 1). For example, the information in data entry 2 may be stored with the first metadata indicating that the first pseudonymized data was generated using the first version of the secret. By stripping (e.g., using the function g( ) as shown) the first metadata of the data entry 2 (e.g., the metadata indicative of use of the first version ver=1), and hashing user ID 1 with the second secret (e.g., the rotated version of the secret 1), the pseudonymized ID 2 may be generated with the hashed value and prefixed with second metadata (e.g., indicating Ver=2 for secret 2). For example, the function f( ) may include the functions g( ) and h( ) as shown. In this manner, the pseudonymized ID 2 may represent the pseudonymized ID 1 hashed with the secret 2. In this manner, the data entry 2 may be updated by replacing pseudonymized ID 1 with pseudonymized ID 2, and by replacing metadata 1 with metadata 2. In this manner, any data entries having common information (e.g., the user 1) may be joined because their pseudonymized data may be updated using the most recent version of a secret being used.

In one or more embodiments, the metadata may be indicative of the version of the secret and/or the type of hashing method used to generate the pseudonymized data of a data entry. When metadata of one data entry does not match the metadata of one or more other data entries, such may be an indicator that a data entry was pseudonymized using a previous version of a secret and may be updated using the most recent version of a secret. For example, when the first metadata does not match the second metadata because the first metadata indicates that the first version of the secret was used and the second metadata indicates that the second version of the secret was used, the data entry 2 may be updated by using the enhanced secret rotation process (e.g., Equation (1)) to generate updated pseudonymized data based on a hashing of pseudonymized ID 1 with the secret 2. In this manner, any data entries whose metadata indicate that an older version of the secret (e.g., prior to secret 1) was used in the hashing may be provided as inputs to the hashing algorithm according to Equation (1). The "old" metadata indicating that an older version of the secret and/or the type of hashing method (e.g., the hashing method may be rotated) used to generate the pseudonymized data may be replaced with new metadata indicating that the pseudonymized data was generated using the latest version of the secret and/or the latest hashing method.

In one or more embodiments, a rotation of the secret may occur periodically and/or based on a request to rotate the version of the secret. In this manner, a rotation of the secret may result in identification of data pseudonymized based on an older version of the secret and/or the type of hashing method, and to update the "older" pseudonymized data by hashing the older pseudonymized data with the newest version of the secret according to Equation (1). In this manner, a data entry pseudonymized using an older version of the secret and/or the type of hashing method may be joined with data entries using the most recent version of the secret and/or the type of hashing method.

Figure 2:
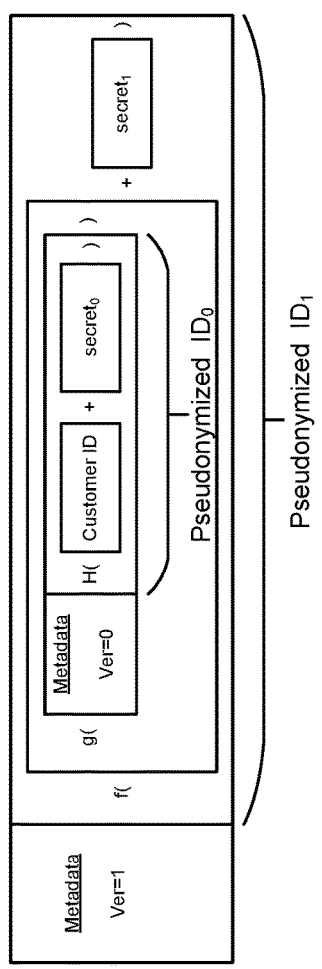
FIG. 2 illustrates an example process for enhanced secret rotation in data hashing, in accordance with one or more example embodiments of the present disclosure.

FIG. 2 illustrates an example process 200 for enhanced secret rotation in data hashing, in accordance with one or more example embodiments of the present disclosure.

Referring to FIG. 2, the process 200 may represent Equation (1) above. In particular, first pseudonymized data (pseudonymized $ID_0$) may be generated by providing data (e.g., customer ID) and a first version of a cryptography secret ($secret_0$) as inputs to a one-way hashing algorithm that outputs the first pseudonymized data using the hashed data with the first version of the cryptography secret, and prefixed with first metadata indicative of the first version of the cryptography secret (e.g., Ver=0). To generate second pseudonymized data (pseudonymized $ID_1$), the stripping function g( ) may remove the first metadata, and the hashing function H( ) may receive as inputs the first pseudonymized data (pseudonymized $ID_0$) and, as part of function f( ) may hash the first pseudonymized data with the second version of the secret ($secret_1$). For example, the second version of the secret may be a rotated version of the first version of the secret. In this manner, when the secret is rotated (e.g., to generate another version of the secret), pseudonymized data based on the previous version of the secret may be an input to the function f( ) to generate the second pseudonymized data, allowing for the joining of the first and second pseudonymized data.

As shown, the data that is pseudonymized includes a customer ID. However, other sensitive data may be pseudonymized or otherwise obfuscated using the process 200. For example, peoples' names, user logins, e-mail addresses, contact information, passwords, personal preferences, personal health information (PHI), personally identifiable information (PII), purchase history, browser history, page view history, subscription data, user selection data, and the like may be protected by using the enhanced hashing of the process 200.

Figure 3:
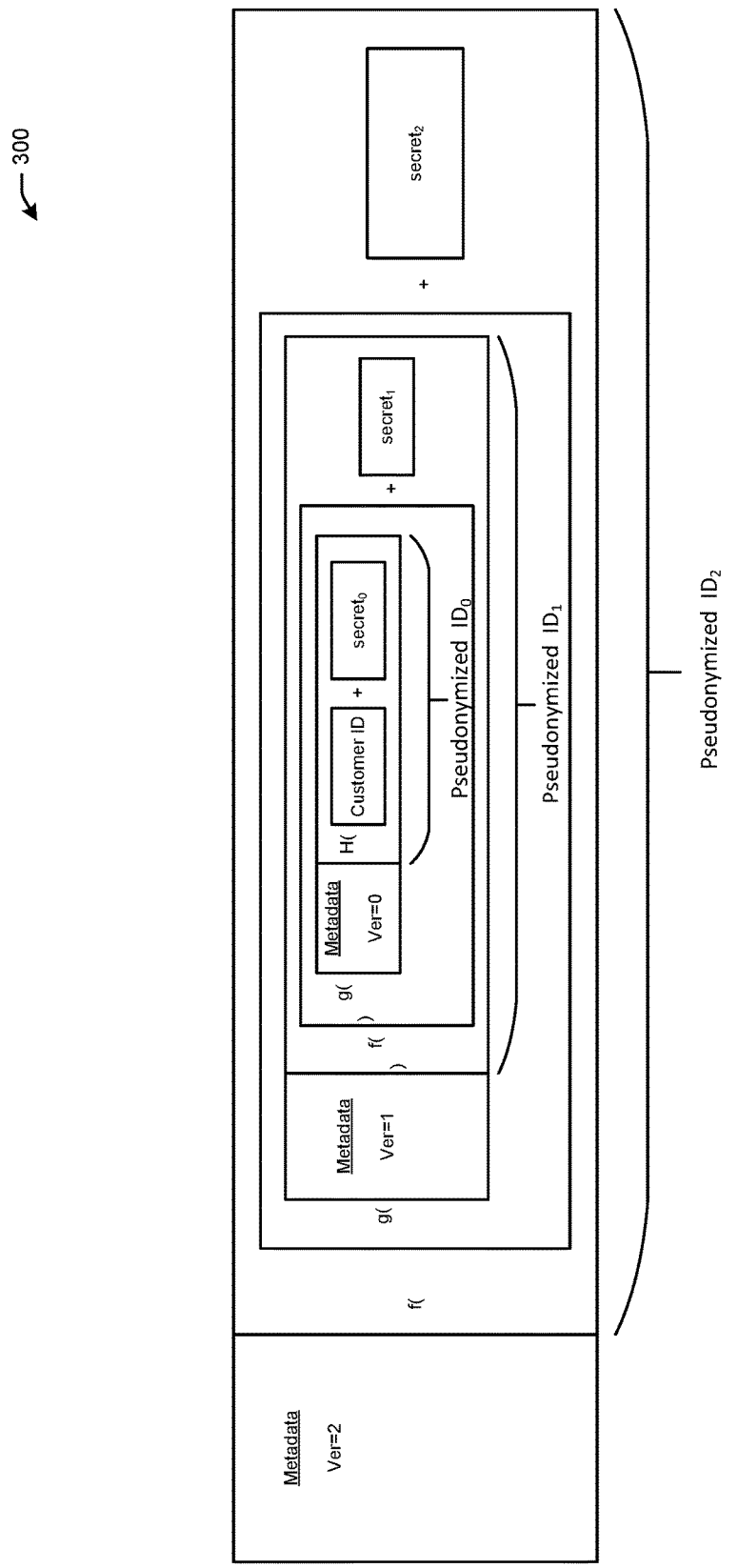
FIG. 3 illustrates an example process for enhanced secret rotation in data hashing, in accordance with one or more example embodiments of the present disclosure.

FIG. 3 illustrates an example process 300 for enhanced secret rotation in data hashing, in accordance with one or more example embodiments of the present disclosure.

Referring to FIG. 3, the process 300 may represent Equation (1) above with more than two versions of a secret. In particular, first pseudonymized data (pseudonymized $ID_0$) may be generated by providing data (e.g., customer ID) and a first version of a cryptography secret ($secret_0$) as inputs to a one-way hashing algorithm that outputs the first pseudonymized data using the hashed data with the first version of the cryptography secret, and prefixed with first metadata indicative of the first version of the cryptography secret (e.g., Ver=0). To generate second pseudonymized data (pseudonymized $ID_1$), the stripping function g( ) may remove the first metadata, and the hashing function H( ) may receive as inputs the first pseudonymized data (pseudonymized $ID_0$) and, as part of function f( ) may hash the first pseudonymized data with the second version of the secret ($secrets$). For example, the second version of the secret may be a rotated version of the first version of the secret. In this manner, when the secret is rotated (e.g., to generate another version of the secret), pseudonymized data based on the previous version of the secret may be an input to the function f( ) to generate the second pseudonymized data, allowing for the joining of the first and second pseudonymized data.

Still referring to FIG. 3, to generate third pseudonymized data (pseudonymized $ID_2$), the stripping function g( ) may remove the second metadata, and the hashing function H( ) may receive as inputs the second pseudonymized data (pseudonymized $ID_1$) and, as part of function f( ) may hash the second pseudonymized data with the third version of the secret (secrete). For example, the third version of the secret may be a rotated version of the second version of the secret. In this manner, when the secret is rotated (e.g., to generate another version of the secret), pseudonymized data based on the previous version of the secret may be an input to the function f( ) to generate the second pseudonymized data, allowing for the joining of the first, second, and third pseudonymized data. In this manner, a secret may be rotated multiple times, and any data pseudonymized with an older version of the secret may be updated using the process 300.

As shown, the data that is pseudonymized includes a customer ID. However, other sensitive data may be pseudonymized or otherwise obfuscated using the process 200. For example, peoples' names, user logins, e-mail addresses, contact information, passwords, personal preferences, personal health information (PHI), personally identifiable information (PII), purchase history, browser history, page view history, subscription data, user selection data, and the like may be protected by using the enhanced hashing of the process 300.

Figure 4:
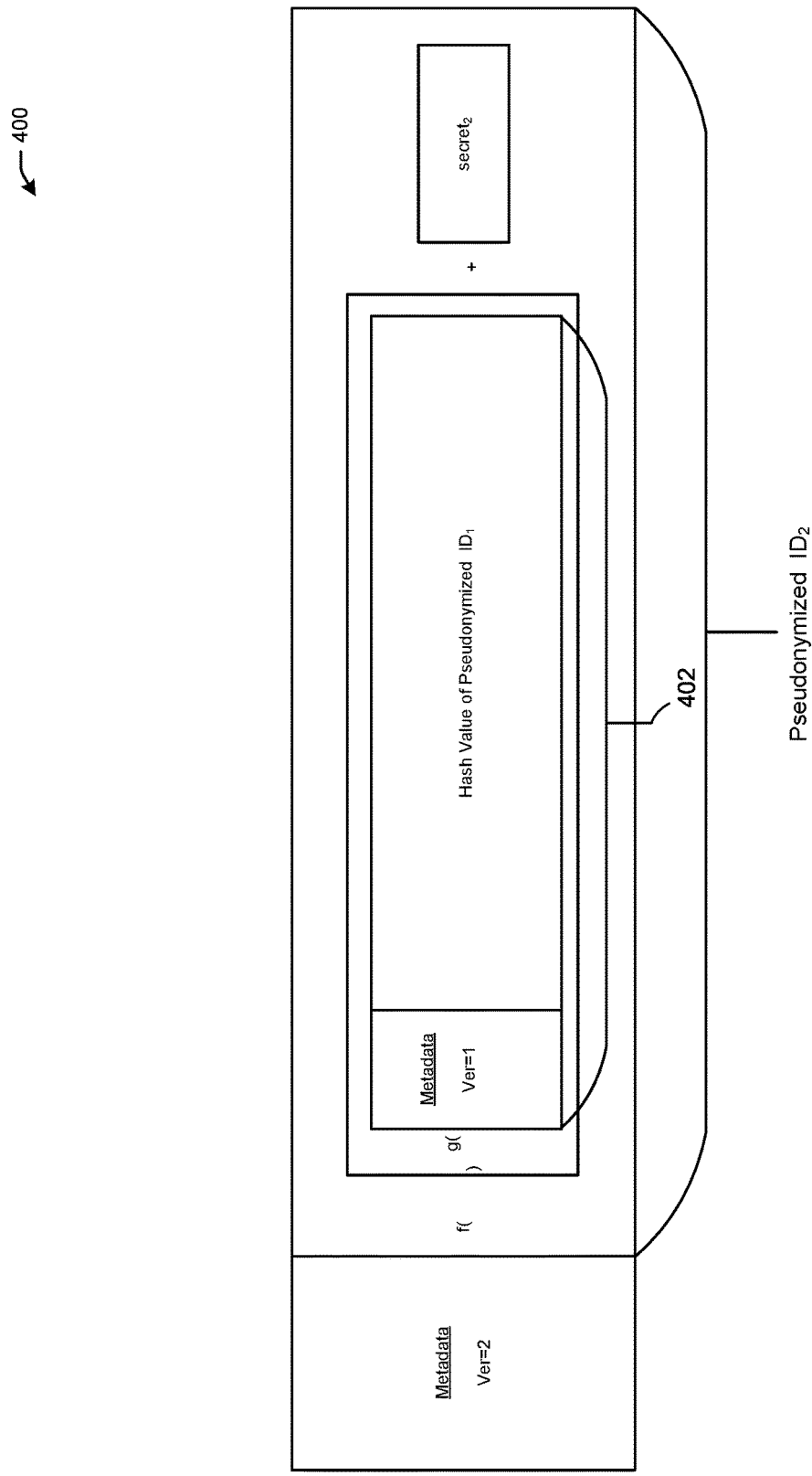
FIG. 4 illustrates an example process for enhanced secret rotation in data hashing, in accordance with one or more example embodiments of the present disclosure.

FIG. 4 illustrates an example process 400 for enhanced secret rotation in data hashing, in accordance with one or more example embodiments of the present disclosure.

Referring to FIG. 4, the process 400 may represent Equation (1) above. In particular, first pseudonymized data (pseudonymized $ID_1$) may be generated by providing data and a first version of a cryptography secret ($secret_1$) as inputs to a one-way hashing algorithm that outputs the first pseudonymized data using the hashed data with the first version of the cryptography secret, and prefixed with first metadata indicative of the first version of the cryptography secret (e.g., Ver=1 for $secret_1$). To generate second pseudonymized data (pseudonymized $ID_1$), the stripping function g( ) may remove the first metadata, and the hashing function H( ) may receive as inputs the first pseudonymized data (pseudonymized $ID_0$) and, as part of function f( ) may hash the first pseudonymized data with the second version of the secret ($secret_1$). For example, the second version of the secret may be a rotated version of the first version of the secret. In this manner, when the secret is rotated (e.g., to generate another version of the secret), pseudonymized data based on the previous version of the secret may be an input to the function f( ) to generate the second pseudonymized data, allowing for the joining of the first and second pseudonymized data.

Still referring to FIG. 4, because the hashing function may be a one-way hashing function, information 402 may be all that is identified when the pseudonymized $ID_1$ is retrieved from a database (e.g., the data store 120 of FIG. 1). The inputs to the hashing function used to generate the pseudonymized $ID_1$ should not be known based on the pseudonymized $ID_1$. The first metadata (Ver=1) may be retrieved along with the hashed value of the pseudonymized $ID_1$, and the first metadata may indicate the hashing function and/or the version of the secret (e.g., Ver=1, corresponding to the $secret_1$) used to generate the hashed value of the pseudonymized $ID_1$. For example, if the inputs include a user ID (e.g., Joe Smith) and a first version of the secret (e.g., $secret_1$), then the information 402 may include the first metadata and the hashed value of pseudonymized $ID_1$ based on the inputs. The user ID and the secret may not be known, but the first metadata and the hashed value of the pseudonymized $ID_1$ may be retrieved. For example, if a system had the secret and the hash table, the system may determine the user ID based on the pseudonymized $ID_1$. In this manner, the secret provides an additional layer of protection (e.g., in addition to the hashing without a secret), and rotating the secret provides even more protection. The enhanced secret rotation that uses Equation (1) allows for rotating secrets and updating obfuscated data based on prior versions of a secret.

Because the inputs to the pseudonymized $ID_1$ may not be known, joining data entries that include data pseudonymized using different secrets may be a challenge without the process 400. Two pseudonymized data entries may use the same inputs (e.g., a same user ID, a same login, a same address, etc.), but when hashed using different versions of the secret, there may be no way to identify the common inputs used to generate the different pseudonymized data of the different data entries. For example, the user ID "Joe Smith" hashed with $secret_1$ may produce a first hashed value that is different than a second hashed value generated using the user ID "Joe Smith" hashed with $secret_2$. In this manner, the first hashed value and the second hashed value may not be joined. However, using the process 400, such data may be joined because the first hashed value may be updated using $secret_2$. The first metadata may indicate whether the first hashed value is to be updated using $secret_2$ because the first metadata may indicate the use of the $secret_1$ in generating the hashed value of the pseudonymized $ID_1$.

With reference to FIG. 4, the pseudonymized $ID_2$ may not be hashed using the older version of the secret (e.g., $secret_1$). In this manner, pseudonymized data hashed with a newer version of a secret may not be re-hashed using an older version of the secret. Once the secret is rotated, data may be hashed with the rotated secret, but not a previous version of the secret.

Figure 5:
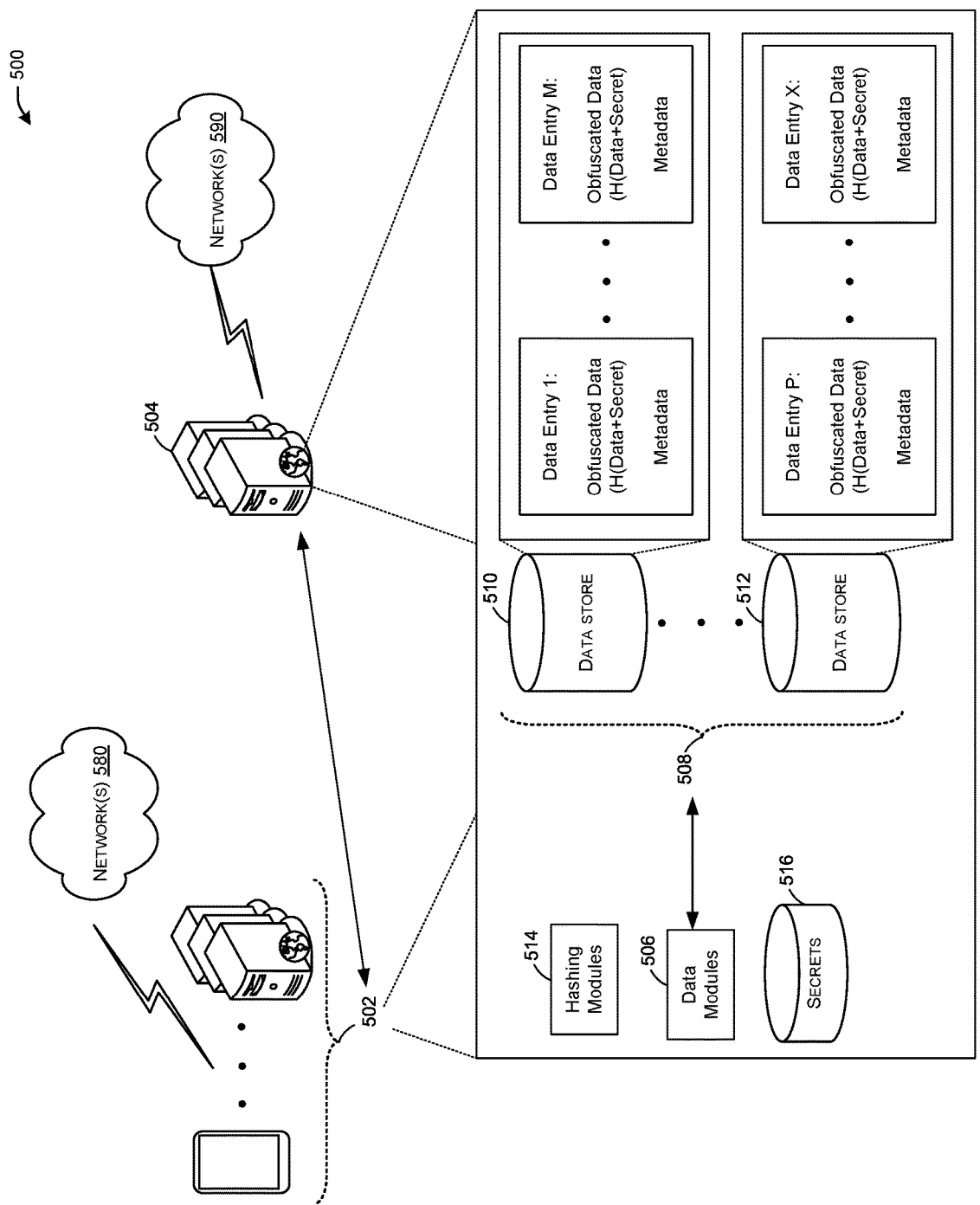
FIG. 5 illustrates an example system for enhanced secret rotation in data hashing, in accordance with one or more example embodiments of the present disclosure.

FIG. 5 illustrates an example system 500 for enhanced secret rotation in data hashing, in accordance with one or more example embodiments of the present disclosure.

Referring to FIG. 5, one or more devices 502 may be in communication with one or more network-based devices 504 (e.g., cloud-based servers), and the one or more devices 502 and/or the one or more network-based devices 504 may include or have access to obfuscated data. For example, the one or more devices 502 and/or the one or more network-based devices 504 may include data modules 506 (e.g., serverless computing functions) to receive requests and generate instances to execute computer code, such as to authenticate users, read and write data, analyze advertising data, analyze purchase data, and the like. For example, the data modules 506 may have access to data stores 508, which may store data entries having obfuscated data. For example, a data store 510 may store data entries (e.g., data entry 1-data entry M), and data store 512 may store data entries (e.g., data entry P-data entry X). The data entries may include obfuscated data based on a hashing function (H( )) that receives data and a secret as inputs, and generates a hashed value as an output (e.g., using hashing modules 514). When the obfuscated data of one data entry (e.g., data entry 1) is hashed using a different version of a secret (e.g., as indicated by metadata) than the obfuscated data of another data entry (e.g., data entry M), such may cause the hashing modules 514 to identify data entries having metadata indicating a previous version of a secret, and applying Equation (1) to generate updated obfuscated data by stripping the existing metadata and hashing the existing obfuscated data with the newest version of the secret. In this manner, multiple data entries with prior versions of the secret may be identified and updated using the new secret. The secrets 516 may be stored, but may not be made available to some, if any, requesting devices or services.

Any of the one or more devices 502 and/or the one or more network-based devices 540 may be configured to communicate with each other via one or more communications networks 580 and/or 590 wirelessly or wired. Any of the communications networks 580 and/or 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 580 and/or 590 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 580 and/or 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 6A:
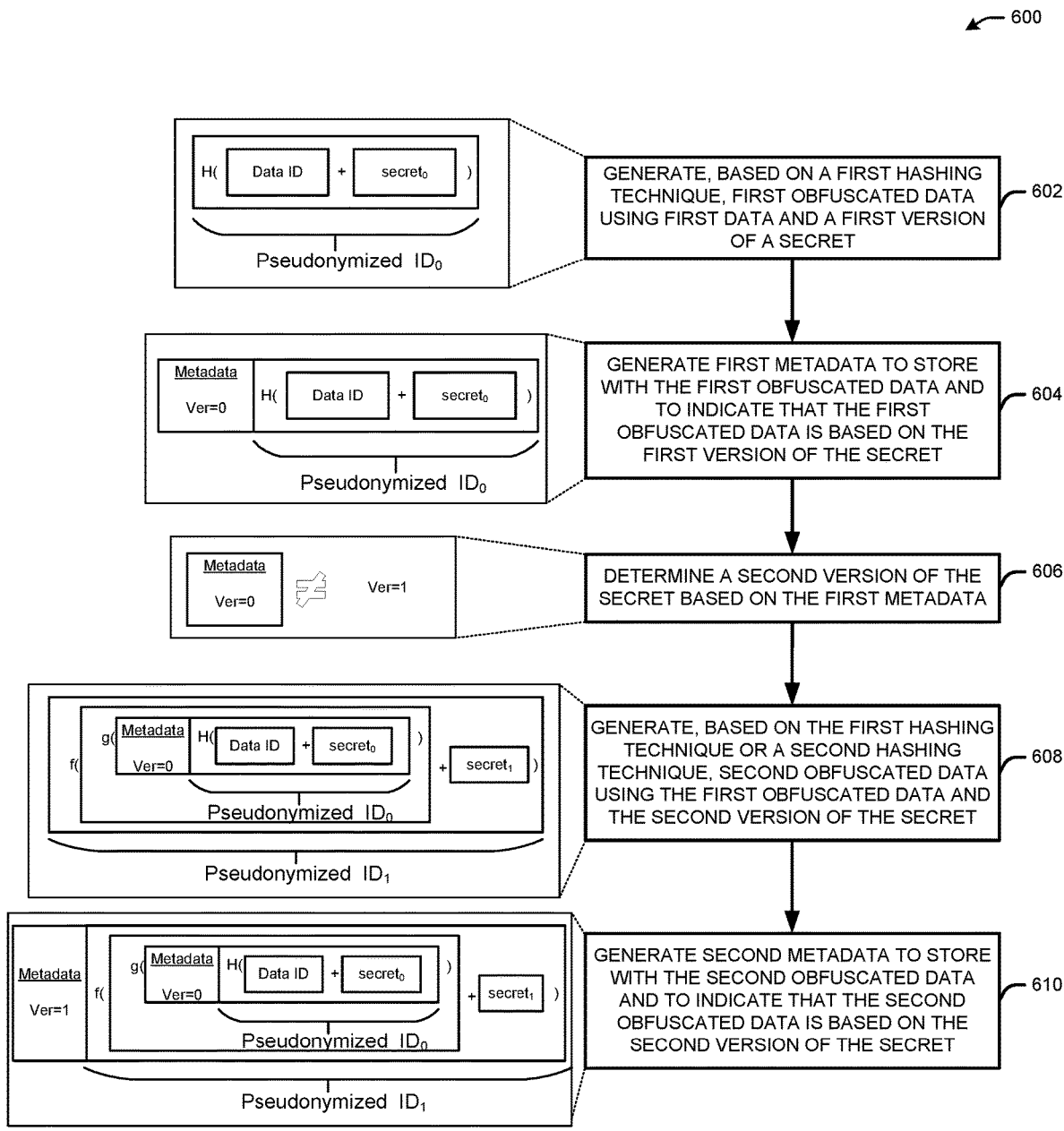
FIG. 6A illustrates a flow diagram for a process for enhanced secret rotation in data hashing, in accordance with one or more example embodiments of the present disclosure.

FIG. 6A illustrates a flow diagram for a process 600 for enhanced secret rotation in data hashing, in accordance with one or more example embodiments of the present disclosure.

At block 602, a system (or device, e.g., the one or more devices 502 and/or the one or more network-based devices 540) may generate, based on a first hashing technique(H( ) of Equation (1)), first obfuscated data (e.g., pseudonymized $ID_0$) using first data (e.g., Data ID, referring to any sensitive data to be obfuscated using hashing) and a first version of a secret (e.g., $secret_0$). The first data and the first version of the secret may be inputs to the hashing technique, which may generate the first obfuscated data as an output.

At block 604, the system may generate first metadata (e.g., metadata Ver=0) to store with the first obfuscated data (e.g., using the data store 120 of FIG. 1) and to indicate that the first obfuscated data is based on the first version of the secret (e.g., Ver=0 may refer to $secret_0$). In this manner, when the hashing technique is a one-way hashing technique, the inputs used to generate the first obfuscated data when retrieved may be unknown, but the first metadata may indicate a version of the secret used to generate the first obfuscated data without actually providing the exact secret (e.g., just its version and/or the hashing technique used). The first metadata may indicate the first hashing technique used to generate the first obfuscated data (e.g., SHA2, SHA512, HMAC, etc.).

At block 606, the system may determine a second version of the secret based on the first metadata. The first metadata may indicate the first version of the secret, which may not be the latest version of the secret. For example, the first metadata may indicate that $secret_0$ was used to generate the first obfuscated data, but a later version (e.g., Ver=1 referring to $secret_1$) may be used to generate second obfuscated data. When the first metadata indicates that the first obfuscated data was generated using a previous version of the secret (e.g., determining the second metadata indicative of a second version of the secret different than the first version of the secret indicated by the first metadata), the system may update the first obfuscated data and any other obfuscated data generated using a version of the secret different than the second version of the secret. In this manner, even though obfuscated data may be generated using a one-way hashing technique, the metadata stored with any obfuscated data may indicate whether the obfuscated data are generated using a prior version of the secret so that the system may join the previous obfuscated data with newer versions of obfuscated data generated using a newer version of the secret.

At block 608, the system may generate, based on the first hashing technique or a second hashing technique (e.g., different than the first hashing technique), second obfuscated data using the first obfuscated data and the second version of the secret. For example, using Equation (1) above, a stripping function g( ) may be applied to the first obfuscated data to strip the first metadata. The first obfuscated data (e.g., the hashed value of the first data and the first version of the secret) may be hashed using the second version of the secret to generate the second obfuscated data (e.g., pseudonymized $ID_1$). In this manner, the first obfuscated data may be used to generate the second obfuscated data, and the second version of the secret (e.g., the newer, rotated version of the secret) may be used to generate the second obfuscated data, thereby joining the first obfuscated data with the second obfuscated data.

At block 610, the system may generate second metadata (e.g., metadata Ver=1) to store with the second obfuscated data (e.g., using the data store 120 of FIG. 1) and to indicate that the second obfuscated data is based on the second version of the secret (e.g., Ver=1 may refer to secrets). In this manner, when the hashing technique is a one-way hashing technique, the inputs used to generate the second obfuscated data when retrieved may be unknown, but the second metadata may indicate a version of the secret used to generate the second obfuscated data without actually providing the exact secret (e.g., just its version and/or the hashing technique used). The second metadata may indicate the first or second hashing technique used to generate the second obfuscated data (e.g., SHA2, SHA512, HMAC, etc.).

Figure 6B:
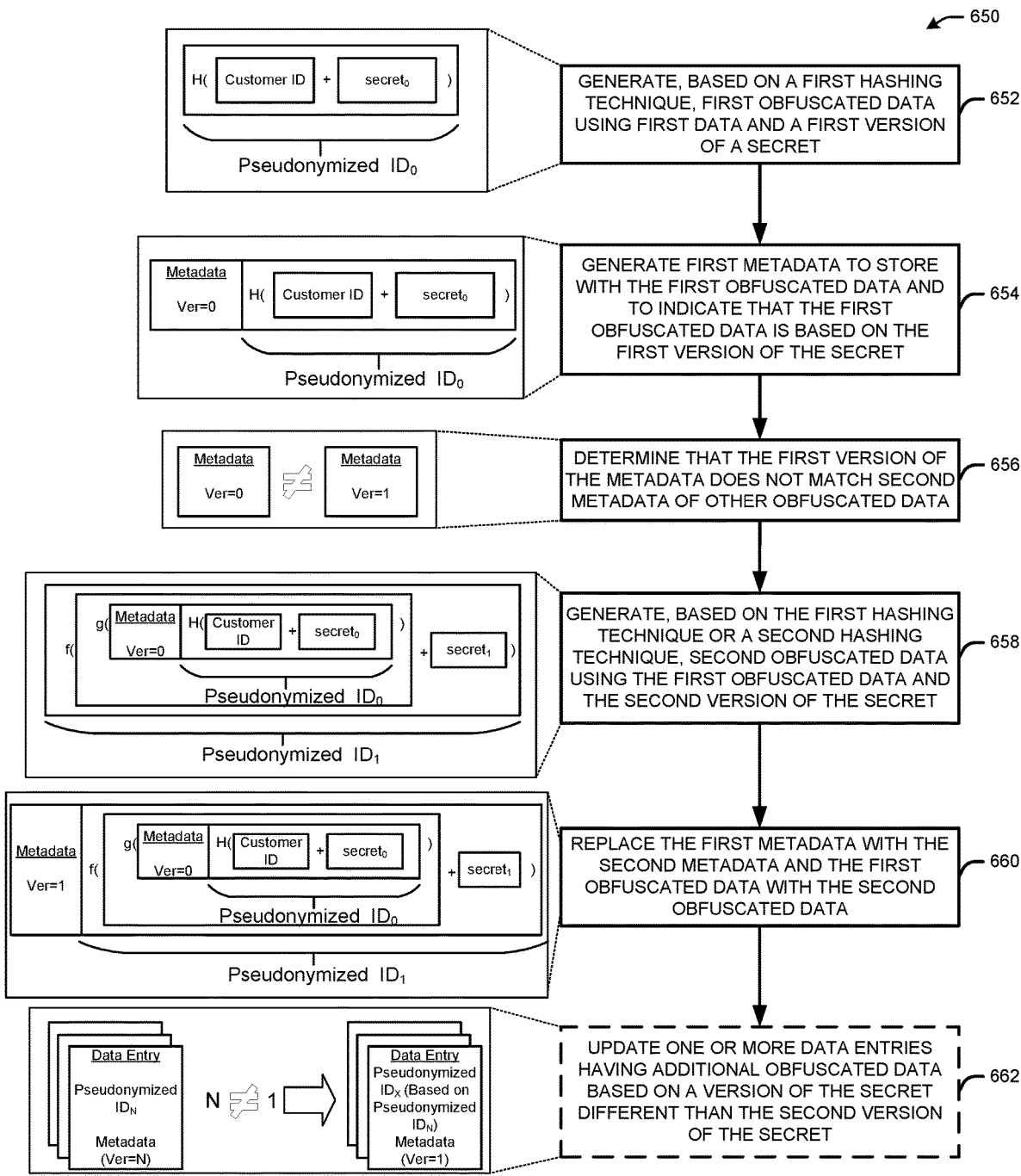
FIG. 6B illustrates a flow diagram for a process for enhanced secret rotation in data hashing, in accordance with one or more example embodiments of the present disclosure.

FIG. 6B illustrates a flow diagram for a process 650 for enhanced secret rotation in data hashing, in accordance with one or more example embodiments of the present disclosure.

At block 652, a system (or device, e.g., the one or more devices 502 and/or the one or more network-based devices 540) may generate, based on a first hashing technique(H( ) of Equation (1)), first obfuscated data (e.g., pseudonymized $ID_0$) using first data (e.g., Data ID, referring to any sensitive data to be obfuscated using hashing) and a first version of a secret (e.g., $secret_0$). The first data and the first version of the secret may be inputs to the hashing technique, which may generate the first obfuscated data as an output.

At block 654, the system may generate first metadata (e.g., metadata Ver=0) to store with the first obfuscated data (e.g., using the data store 120 of FIG. 1) and to indicate that the first obfuscated data is based on the first version of the secret (e.g., Ver=0 may refer to $secret_0$). In this manner, when the hashing technique is a one-way hashing technique, the inputs used to generate the first obfuscated data when retrieved may be unknown, but the first metadata may indicate a version of the secret used to generate the first obfuscated data without actually providing the exact secret (e.g., just its version and/or the hashing technique used). The first metadata may indicate the first hashing technique used to generate the first obfuscated data (e.g., SHA2, SHA512, HMAC, etc.).

At block 656, the system may determine that the first version of the secret does not match a second version of the secret based on the first metadata and second metadata stored with other obfuscated data. The first metadata may indicate the first version of the secret, which may not be the latest version of the secret. For example, the first metadata may indicate that $secret_0$ was used to generate the first obfuscated data, but a later version (e.g., Ver=1 referring to $secret_1$) as indicated by the second metadata may be used to generate the other obfuscated data. When the first metadata indicates that the first obfuscated data was generated using a previous version of the secret, the system may update the first obfuscated data and any other obfuscated data generated using a version of the secret different than the second version of the secret. In this manner, even though obfuscated data may be generated using a one-way hashing technique, the metadata stored with any obfuscated data may indicate whether the obfuscated data are generated using a prior version of the secret so that the system may join the previous obfuscated data with newer versions of obfuscated data generated using a newer version of the secret.

At block 658, the system may generate, based on the first hashing technique or a second hashing technique (e.g., different than the first hashing technique), second obfuscated data using the first obfuscated data and the second version of the secret. For example, using Equation (1) above, a stripping function g( ) may be applied to the first obfuscated data to strip the first metadata. The first obfuscated data (e.g., the hashed value of the first data and the first version of the secret) may be hashed using the second version of the secret to generate the second obfuscated data (e.g., pseudonymized $ID_1$). In this manner, the first obfuscated data may be used to generate the second obfuscated data, and the second version of the secret (e.g., the newer, rotated version of the secret) may be used to generate the second obfuscated data, thereby joining the first obfuscated data with the second obfuscated data.

At block 660, the system may replace the first metadata with the second metadata (e.g., metadata Ver=1) to store with the second obfuscated data (e.g., using the data store 120 of FIG. 1) and to indicate that the second obfuscated data is based on the second version of the secret (e.g., Ver=1 may refer to secrets). In this manner, when the hashing technique is a one-way hashing technique, the inputs used to generate the second obfuscated data when retrieved may be unknown, but the second metadata may indicate a version of the secret used to generate the second obfuscated data without actually providing the exact secret (e.g., just its version and/or the hashing technique used). The second metadata may indicate the first or second hashing technique used to generate the second obfuscated data (e.g., SHA2, SHA512, HMAC, etc.).

At block 662, optionally, the system may update one or more data entries having additional obfuscated data stored with metadata indicating that they were generated using a version of the secret that is different than the second version of the secret. In this manner, any data entry with obfuscated data generated with a different (e.g., previous) version of the secret may be identified using the metadata and may be updated by generating an updated version of the obfuscated data using the second version of the secret, such as by using Equation (1) above.

The examples presented herein are not intended to be limiting.

Figure 7:
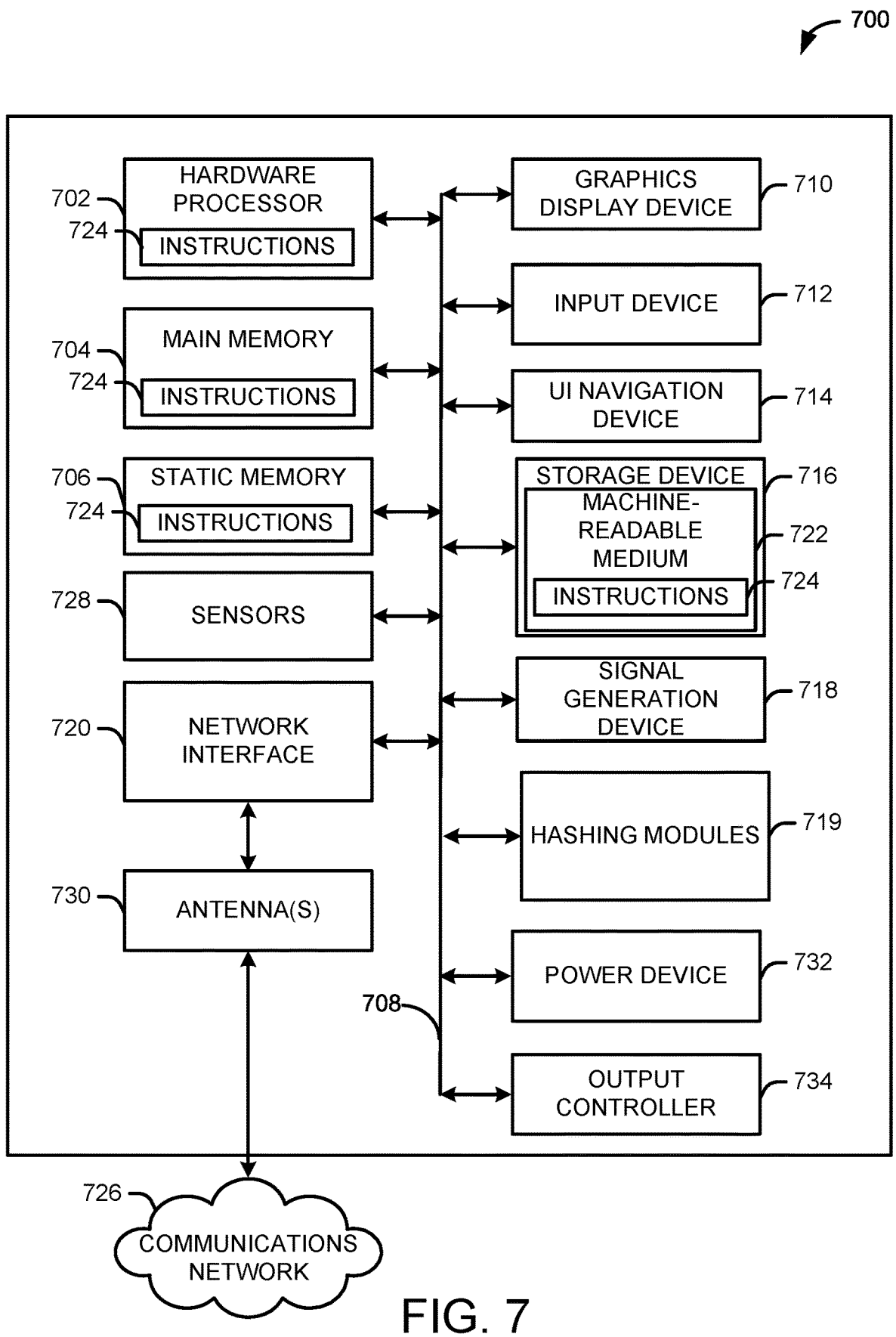
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the one or more devices 502 of FIG. 5, the one or more network-based devices 504 of FIG. 5) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, tensor processing unit (TPU) with an artificial intelligence application-specific integrated circuit (ASIC), or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718, hashing modules 719 (e.g., the hashing modules 514 of FIG. 5) a network interface device/transceiver 720 coupled to antenna(s) 730, and one or more sensors 728, microphones, cameras, a global positioning system (GPS) sensor, a compass, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The hashing modules 719 may carry out or perform any of the operations and processes (e.g., process 600 of FIG. 6A, process 650 of FIG. 6B) described and shown above. The hashing modules may be executed by serverless computing instances (e.g., using the one or more network-based devices 504 of FIG. 5).

It is understood that the above are only a subset of what the hashing modules 719 may be configured to perform and that other functions included throughout this disclosure may also be performed by the hashing modules 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIN/IO), multiple-input multiple-output (MIN/IO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, encryption software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving, by at least one processor of a device, first data indicative of a first purchase by a first user;
providing, by the at least one processor, the first data and a first version of a cryptography salt as first inputs to a one-way hashing technique, wherein the one-way hashing technique generates first pseudonymized data as a first output based on the first inputs, and wherein the first pseudonymized data represent pseudonymization of the first data and the first version of the cryptography salt;
generating, by the at least one processor, first metadata associated with the first pseudonymized data, the first metadata indicative of the first version of the cryptography salt;
storing, by the at least one processor, the first pseudonymized data with the first metadata in a database;
receiving, by the at least one processor, second data indicative of a second purchase by a second user;
providing, by the at least one processor, the second data and a second version of the cryptography salt as second inputs to the one-way hashing technique, wherein the one-way hashing technique generates second pseudonymized data as a second output based on the second inputs;
generating, by the at least one processor, second metadata associated with the second pseudonymized data, the second metadata indicative of the second version of the cryptography salt;
storing, by the at least one processor, the second pseudonymized data with the second metadata in a database;
determining, by the at least one processor, that the first metadata does not match the second metadata;
providing, by at least one processor, based on the determination that the first metadata does not match the second metadata, the first pseudonymized data and the second version of the cryptography salt as third inputs to the one-way hashing technique, wherein the one-way hashing technique generates third pseudonymized data as a third output based on the third inputs, and wherein the third pseudonymized data represent pseudonymization of the first data and the second cryptography salt;
replacing, by the at least one processor, the first pseudonymized data with the third pseudonymized data in the database; and
replacing, by the at least one processor, the first metadata with the second metadata in the database.

2. The method of claim 1, further comprising:
receiving a request to rotate the first version of the cryptography salt to the second version of the cryptography salt; and
generating the second version of the cryptography salt based on the request,
wherein determining that the first metadata does not match the second metadata is based on the request.

3. The method of claim 1, further comprising:
identifying third metadata stored in the database with fourth pseudonymized data, the third metadata indicative of a third version of the cryptography salt;
determining that the third metadata does not match the second metadata;
providing, based on the determination that the third metadata does not match the second metadata, the fourth pseudonymized data and the third version of the cryptography salt as fourth inputs to the one-way hashing technique, wherein the one-way hashing technique generates fifth pseudonymized data as a fourth output based on the fourth inputs;
replacing the fourth pseudonymized data with the fifth pseudonymized data in the database; and
replacing the third metadata with the second metadata in the database.

4. The method of claim 1, further comprising:
determining, based on a comparison of the third pseudonymized data to the second pseudonymized data, that the first user and the second user are a same user.

5. A method comprising:
generating, by at least one processor of a device, based on a hashing technique, first obfuscated data using first data and a first version of a secret, wherein the first obfuscated data represent obfuscation of the first data and the first version of the secret;
generating, by the at least one processor, first metadata associated with the first obfuscated data, the first metadata indicative of the first version of the secret;
determining, by the at least one processor, a second version of the secret based on the first metadata;
generating, by the at least one processor, based on the hashing technique, second obfuscated data using the first obfuscated data and the second version of the secret, wherein the second obfuscated data represent obfuscation of the first data and the second version of the secret; and
generating, by the at least one processor, second metadata associated with the second obfuscated data, the second metadata indicative of the second version of the secret.

6. The method of claim 5, further comprising:
replacing the first obfuscated data with the second obfuscated data.

7. The method of claim 5, further comprising:
storing the second obfuscated data in a database with the second metadata.

8. The method of claim 5, further comprising:
storing the first obfuscated data in a database with the first metadata; and
replacing, based on the generation of the second obfuscated data, the first metadata with the second metadata in the database.

9. The method of claim 5, wherein the hashing technique is a one-way hashing technique.

10. The method of claim 5, further comprising:
providing the first obfuscated data and the second version of the secret as inputs to the hashing technique, wherein generating the second obfuscated data is based on the hashing technique generating the second obfuscated data as an output based on the inputs.

11. The method of claim 5, further comprising:
identifying the second metadata stored in a database with third obfuscated data; and
comparing the first metadata to the second metadata,
wherein determining the second version of the secret is further based on the comparison of the first metadata to the second metadata.

12. The method of claim 11, further comprising:
determining that the first metadata does not match the second metadata,
wherein determining the second version of the secret is further based on the determination that the first metadata does not match the second metadata.

13. The method of claim 5, wherein the second metadata is further indicative of the hashing technique.

14. The method of claim 5, further comprising:
identifying third metadata stored in a database with third obfuscated data, the third metadata indicative of a second hashing technique used to generate the third obfuscated data;
determining that the second metadata does not match the third metadata;
generating, based on the hashing technique, fourth obfuscated data using the third obfuscated data and the second version of the secret; and
replacing the third metadata in the database with the second metadata.

15. The method of claim 5, further comprising:
identifying third metadata stored in a database with third obfuscated data, the third metadata indicative of a third version of the secret;
determining that the third metadata does not match the second metadata;
providing, based on the determination that the third metadata does not match the second metadata, the third obfuscated data and the third version of the secret as inputs to the hashing technique, wherein the hashing technique generates fourth obfuscated data as an output based on the inputs;

replacing the third obfuscated data with the fourth obfuscated data in the database; and replacing the third metadata with the second metadata in the database.

16. The method of claim 5, further comprising:

determining, based on a comparison of the first obfuscated data to the second obfuscated data, that the first obfuscated data and the second obfuscated data are generated based on same inputs to the hashing technique.

17. A system comprising memory coupled to at least one processor, the at least one processor configured to:

generate, based on a hashing technique, first obfuscated data using first data and a first version of a secret, wherein the first obfuscated data represent obfuscation of the first data and the first version of the secret;

generate first metadata associated with the first obfuscated data, the first metadata indicative of the first version of the secret;

determine a second version of the secret based on the first metadata;

generate, based on the hashing technique, second obfuscated data using the first obfuscated data and the second version of the secret, wherein the second obfuscated data represent obfuscation of the first data and the second version of the secret; and generate second metadata associated with the second obfuscated data, the second metadata indicative of the second version of the secret.

18. The system of claim 17, wherein the at least one processor is further configured to:

provide the first obfuscated data and the second version of the secret as inputs to the hashing technique, wherein to generate the second obfuscated data is based on the hashing technique generating the second obfuscated data as an output based on the inputs.

19. The system of claim 17, wherein the at least one processor is further configured to:

identify the second metadata stored in a database with third obfuscated data; and compare the first metadata to the second metadata, wherein to determine the second version of the secret is further based on the comparison of the first metadata to the second metadata.

20. The system of claim 17, wherein the at least one processor is further configured to:

determine, based on a comparison of the first obfuscated data to the second obfuscated data, that the first obfuscated data and the second obfuscated data are associated with a same user.

* * * * *